US008044881B2

(12) United States Patent
Nam et al.

(10) Patent No.: US 8,044,881 B2
(45) Date of Patent: Oct. 25, 2011

(54) STEREOSCOPIC DISPLAY DEVICE AND DRIVING METHOD THEREOF

(75) Inventors: Hui Nam, Yongin-si (KR); Jang-Doo Lee, Yongin-si (KR); Hyoung-Wook Jang, Yongin-si (KR); Beom-Shik Kim, Yongin-si (KR); Myoung-Seop Song, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 937 days.

(21) Appl. No.: 11/580,327

(22) Filed: Oct. 13, 2006

(65) Prior Publication Data
US 2007/0091058 A1 Apr. 26, 2007

(30) Foreign Application Priority Data
Oct. 20, 2005 (KR) ......................... 10-2005-0099083

(51) Int. Cl.
*G09G 3/00* (2006.01)
(52) U.S. Cl. ........................................................ 345/32
(58) Field of Classification Search .................. 345/6, 7, 345/32, 51, 56, 58; 348/51–60; 359/465
See application file for complete search history.

(56) References Cited

U.S. PATENT DOCUMENTS

| 5,825,541 | A | * | 10/1998 | Imai ............................... 359/464 |
| 5,875,055 | A | | 2/1999 | Morishima et al. |
| 5,917,539 | A | | 6/1999 | Sorensen et al. |
| 6,094,216 | A | * | 7/2000 | Taniguchi et al. ............... 348/51 |
| 6,448,952 | B1 | * | 9/2002 | Toyoda et al. ................... 345/97 |
| 6,590,553 | B1 | * | 7/2003 | Kimura et al. ................... 345/92 |
| 6,795,241 | B1 | | 9/2004 | Holzbach |
| 2002/0003522 | A1 | * | 1/2002 | Baba et al. ....................... 345/89 |
| 2004/0239580 | A1 | * | 12/2004 | Nagatani et al. ............... 345/1.3 |
| 2005/0185275 | A1 | * | 8/2005 | Jang et al. ..................... 359/465 |

FOREIGN PATENT DOCUMENTS

CN 1356536 A 7/2002
EP 1 737 250 A2 12/2005

(Continued)

OTHER PUBLICATIONS

European Search Report dated Sep. 24, 2007, for EP 06122318.6, in the name of Samsung SDI Co., Ltd.
Korean Patent Abstracts, Publication No. 1020040086528 A; Date of Publication: Oct. 11, 2004; in the name of Masayuki Ezawa.
Korean Patent Abstracts, Publication No. 1020040103724 A; Date of Publication: Dec. 9, 2004; in the name of Hyeong Uk Jang et al.

(Continued)

*Primary Examiner* — Chanh Nguyen
*Assistant Examiner* — Jonathan Blancha
(74) *Attorney, Agent, or Firm* — Christie, Parker & Hale, LLP (57) ABSTRACT

A system and method for driving a stereoscopic image display device includes, during a first period wherein no image is displayed, writing a first data signal corresponding to a first image on a first display cell and writing a second data signal corresponding to a second image on the second display cell. During a second period, the first image and the second image are displayed by driving the barrier to become a first format. During a third period in which no image is displayed, the second data signal is written on the first display cell and the first data signal is written on the second display cell. During a fourth period, the first and second images are displayed by driving the barrier to become a second format. The barrier intercepts and transmits light at different angles in the first format than in the second format.

14 Claims, 5 Drawing Sheets

FOREIGN PATENT DOCUMENTS

| | | |
|---|---|---|
| KR | 10-2004-0086528 | 10/2004 |
| KR | 10-2004-0103724 | 12/2004 |
| KR | 10-2006-0001451 | 1/2006 |
| WO | WO 94/06249 A | 3/1994 |

OTHER PUBLICATIONS

Korean Patent Abstracts, Publication No. 1020060001451 A; Date of Publication: Jan. 6, 2006; in the name of Beom Shik Kim et al.

* cited by examiner

STEREOSCOPIC DISPLAY DEVICE AND DRIVING METHOD THEREOF

CROSS-REFERENCE TO RELATED APPLICATION

This application claims priority to and the benefit of Korean Patent Application No. 10-2005-0099083, filed in the Korean Intellectual Property Office on Oct. 20, 2005, the entire content of which is incorporated herein by reference.

BACKGROUND OF THE INVENTION a) Field of the Invention

The present invention relates to a stereoscopic display device and a driving method thereof, and more particularly to a stereoscopic display device using a barrier and a non-emissive display panel and a driving method thereof.

b) Description of Related Art

In three-dimensional (3D) image display technology, a stereoscopic effect of an object is produced by using binocular parallax, which is a primary factor in recognizing a stereoscopic effect at a short distance.

Typical methods of viewing stereoscopic images not involving wearing of spectacles include a lenticular method, in which a lenticular lens plate having an array of vertically arranged cylindrical lenses is formed in front of an image panel, and a parallax barrier method that separates left-eye and right-eye images using a barrier to obtain a stereoscopic effect. According to the lenticular method and the barrier method, the left-eye image is spatially divided from the right-eye image.

Therefore, a 3D stereoscopic image is observed with half of the resolution of the entire display device because the left- and right-eye images are spatially divided, written, and displayed at respective left- and right-eye pixels. That is, there is a problem in that a 3D resolution is at most a half of the original, two-dimensional (2D) resolution.

The above information disclosed in this Background section is only for enhancement of understanding of the background of the invention and therefore it may contain information that does not constitute prior art that is already known in the United States to a person of ordinary skill in the art.

SUMMARY

A method for driving a stereoscopic image display device including a display panel having a first display cell and a second display cell and concurrently displaying a first image at a first recognizable viewing angle and a second image at a second recognizable viewing angle different from the first recognizable viewing angle, and a barrier arranged in a location corresponding to the display panel for intercepting or transmitting light, includes: during a first period wherein no image is displayed, writing a first data signal corresponding to the first image on the first display cell and writing a second data signal corresponding to the second image on the second display cell; during a second period, displaying the first image and the second image by driving the barrier to become a first format to transmit light; during a third period in which no image is displayed, writing the second data signal on the first display cell and writing the first data signal on the second display cell; and during a fourth period, displaying the first and second images by driving the barrier to become a second format to transmit light. The barrier intercepts and transmits light at different angles in the first format than in the second format.

The second period may be longer than twice the first period and the fourth period is longer than twice the third period, and the barrier may have opaque and transparent regions in the first format that are disposed inversely to respective opaque and transparent regions of the barrier in the second format.

In one embodiment, the barrier is driven to intercept light during the first period and the third period so that no image is displayed. In another embodiment, the display panel includes a backlight for supplying light and a non-emissive element for displaying an image using the light of the backlight, and the backlight emits light during the second period and the fourth period.

The barrier may be driven to be in the first format during the first period, and in the second format during the third period.

On embodiment of a stereoscopic image display device includes: a display panel including display cells, the display cells adapted to receive data signals and to display images corresponding to the data signals; a display panel driver adapted to write the respective data signals on the respective display cells of the display panel; a barrier arranged in a location corresponding to the display panel and including a first barrier cell and a second barrier cell; and a barrier driver adapted to drive the barrier such that the first barrier cell and the second barrier cell become transparent or opaque. The barrier driver is adapted to drive the barrier such that the first barrier cell and the second barrier cell are opaque while the data signals are written on the display cells.

In one embodiment, the display cells include a first display cell and a second display cell, and the data signals include a first image data signal and a second image data signal. In this embodiment, the display panel driver is adapted to write the first image data signal on the first display cell and the second image data signal on the second display cell during a first period, and to write the first image data signal on the second display cell and the second image data signal on the first display cell during a second period.

In another embodiment, the barrier driver is adapted to drive the barrier such that the first barrier cell becomes opaque and the second barrier cell becomes transparent during a third period consecutive to the first period; and the first barrier cell becomes transparent and the second barrier cell becomes opaque during a fourth period consecutive to the second period.

The first period may be shorter than one-half of the third period and the second period is shorter than one-half of the fourth period.

Another embodiment of a stereoscopic image display device includes a display panel including display cells, the display cells adapted to receive data signals and to display images corresponding to the data signals, the display cells having non-emissive elements; a liquid crystal display panel driver adapted to apply the data signals to the respective display cells of the display panel; a backlight for supplying light to the display panel; a backlight driver adapted to drive the backlight such that the backlight is turned off while the data signals are written on the display cells; a barrier arranged in a location corresponding to the display panel and including first and second barrier cells; and a barrier driver for driving the barrier such that the first and second barrier cells become transparent or opaque.

In one embodiment, the display panel comprises first and second display cells; the image data signals comprise first and second image data signals; the display panel driver is adapted to write the first and second image data signals on the respective first and second display cells during a first period, and to write the first and second image data signals on the respective second and first display cells during a second period; and the backlight driver is adapted to drive the backlight such that the backlight is turned on during a third period consecutive to the first period, and during a fourth period consecutive to the second period.

The barrier driver may be adapted to drive the barrier such that: the first and second barrier cells become respectively opaque and transparent during the first period and the third period, and the first and second barrier cells become respectively transparent and opaque during the second period and the fourth period.

The first period may be shorter than one-half of the third period and the second period may be shorter than one-half of the fourth period.

Another embodiment of a method for driving a stereoscopic image display device including a display panel having first and second display cells and concurrently displaying first and second images having different recognizable viewing angles, and a barrier arranged in a location corresponding to the display panel for intercepting and transmitting light, includes: writing a first data signal corresponding to the first image on the first display cell; writing a second data signal corresponding to the second image on the second display cell; and driving the barrier to become a first format. The writing the first data signal, the writing the second data signal, and the driving the barrier are concurrently performed during a first period.

The embodiment may also include writing the second data signal on the first display cell; writing the first data signal on the second display cell; and driving the barrier to become a second format that is different from the first format. The writing the second data signal on the first display cell, the writing the first data signal on the second display cell, and the driving the barrier in the second format may be concurrently performed during a second period.

The first or second periods may be a driving delay time of the barrier.

DETAILED DESCRIPTION OF THE EMBODIMENTS

Various exemplary embodiments of the present invention will hereinafter be described in detail with reference to the accompanying drawings.

Figure 1:
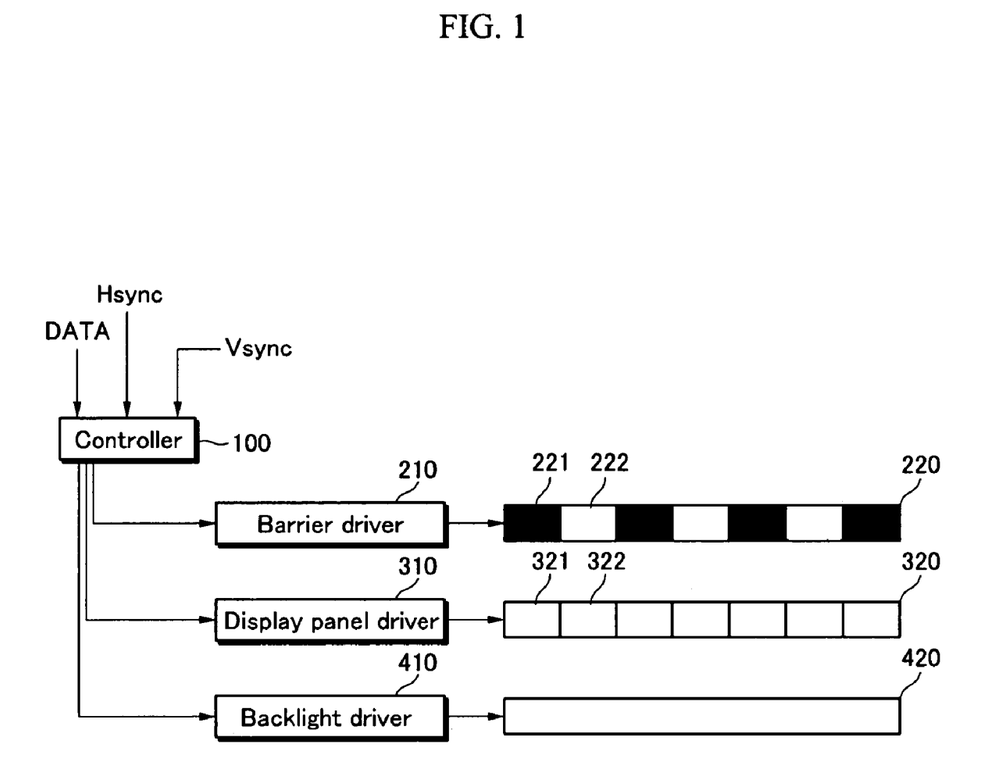
FIG. 1 schematically illustrates a stereoscopic image display device according to an exemplary embodiment of the present invention.

As shown in FIG. 1, a stereoscopic image display device according to one exemplary embodiment of the invention includes a controller 100, a barrier driver 210, a barrier 220, a display panel driver 310, a display panel 320, a backlight 420, and a backlight driver 410.

The controller 100 receives image data DATA, a horizontal synchronization signal Hsync, and a vertical synchronization signal Vsync, it generates a control signal and a data signal, and it transmits the generated control and data signals to the barrier driver 210, the display panel driver 310, and the backlight driver 410.

In one embodiment, the display panel 320 uses a liquid crystal display panel and includes a plurality of display cells 321 and 322. The display panel 320 is formed with a plurality of columns, each having the plurality of display cells 321 and 322 alternately arranged thereon. However, for convenience of description, the plurality of display cells 321 and 322 formed on only one column are shown in FIG. 1.

The display panel driver 310 drives the display panel 320 such that left-eye and right-eye images are respectively displayed on the display cells 321 and 322 based on the control signal and data signal transmitted from the controller 100. For example, the display panel driver 310 is time-divisionally driven such that the left-eye and right-eye images are respectively displayed on the display cells 321 and 322 during a first time T1, and the right-eye and left-eye images are respectively displayed on the display cells 321 and 322 during the second time T2. Designating the image corresponding to a particular data signal to be displayed in the particular display cell is referred to herein as "writing" the data signal "on" the display cell.

In the above case, the sum of the first and second times T1 and T2 becomes one frame. The one frame must be a short time so that an observer cannot perceive a flicker. For example, the first and second times T1 and T2 may each be $\frac{1}{120}$ of a second and the one frame may be $\frac{1}{60}$ of a second.

The barrier 220 includes a plurality of barrier cells 221 and 222 respectively corresponding to the display cells 321 and 322, and is arranged in a location corresponding to the display panel 320. However, for convenience of description, the barrier cells 221 and 222 corresponding to only one column of display cells 321 and 322 are shown in FIG. 1.

The barrier driver 210 time-divisionally drives the barrier 220 such that the barrier cells 221 and 222 become transparent or opaque to a respective right or left eye. The mode in which the barrier transmits and/or intercepts light from particular angles is referred to herein as a "format".

The backlight 420 is a light source for the light emission of a non-emissive element because the display panel 320 is a liquid crystal display panel using the non-emissive element.

The backlight driver 410 controls an on/off status of the backlight based on the control signal of the controller 100.

A method for driving a stereoscopic image display device according to a first exemplary embodiment of the present invention will hereinafter be described in detail with reference to FIG. 2A and FIG. 2B. The stereoscopic image display device sequentially displays a first stereoscopic image including a first left-eye and right-eye images at a first frame, and a second stereoscopic image including a second left-eye and right-eye images at a second frame.

Figure 2A:
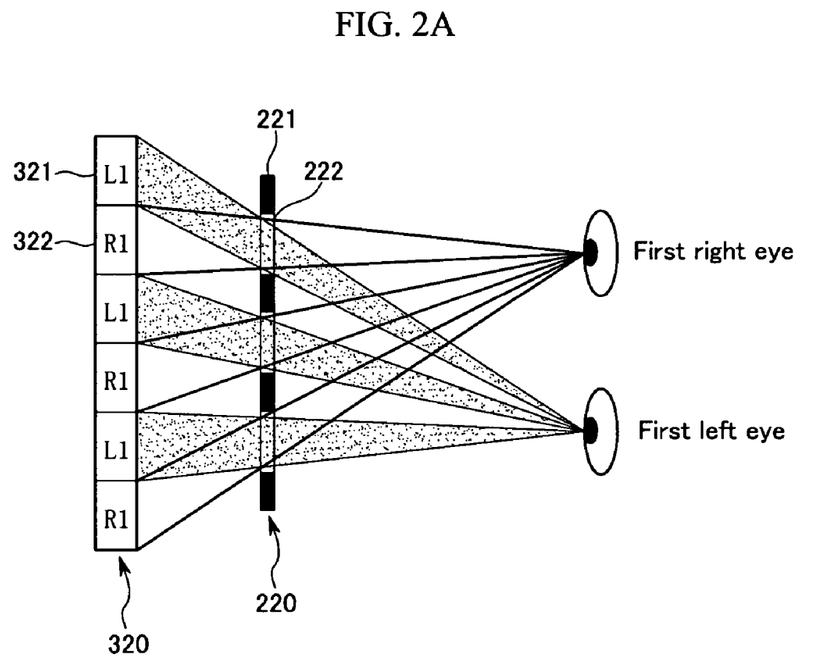
FIG. 2A and FIG. 2B respectively illustrate a process for recognizing a first stereoscopic image displayed during a first time T1 and a second time T2.
Figure 2B:
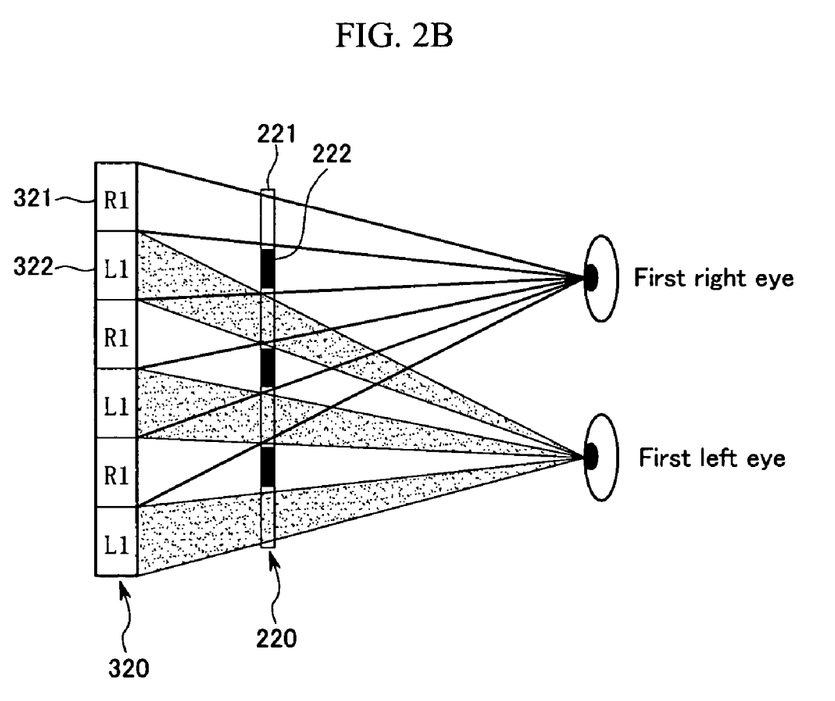

FIG. 2A and FIG. 2B respectively illustrate a process for recognizing a first stereoscopic image displayed during a first time T1 and a second time T2.

As shown in FIG. 2A, during a first time T1 of a first frame, a first left-eye image L1 is displayed on the display cells 321 of the display panel 320 and a first right-eye image R1 is displayed on the display cells 322. At this time, the barrier cells 221 become opaque cells and the barrier cells 222 become transparent cells. As shown in FIG. 2B, during a second time T2 of the first frame, the first left-eye image L1 is displayed on the display cells 322 and the first right-eye image R1 is displayed on the display cells 321. At this time, the barrier cells 222 become opaque cells to thereby intercept the image and the barrier cells 221 become transparent cells to thereby display the image. As such, the first stereoscopic image is displayed.

In the same manner as the first stereoscopic image, during a first time T1 of a second frame, a second left-eye image L2 is displayed on the display cells 321 of the display panel 320 and a second right-eye image R2 is displayed on the display cells 322. At this time, the barrier cells 221 become opaque cells and the barrier cells 222 become transparent cells. During a second time T2 of the second frame, the second left-eye image L2 is displayed on the display cells 322 and the second right-eye image R2 is displayed on the display cells 321. The barrier cells 222 then become opaque cells and the barrier cells 221 become transparent cells. As such, the second stereoscopic image is displayed.

That is, the one left-eye image L1 or L2 is displayed on the display cell 321 during the first time T1, and is displayed on the display cells 322 during the second time T2. Accordingly, the observer concurrently perceives the display cells 321 and 322 so that the 3D stereoscopic image may be shown with the same resolution as the 2D image.

A method for driving a stereoscopic image display device according to an exemplary embodiment of the present invention will hereinafter be described in detail with reference to FIGS. 2A-3.

First, during a time T1_w of the first time T1 of the first frame, a first left-eye image data signal is written on the display cells 321 of the display panel 320. Although not shown, the first left-eye image data signal may be written in the display cells 321 and concurrently a first right-eye image data signal may be written in the display cells 322.

All the cells of the barrier 220 become opaque while the first left eye image data signal is written on the display cells 321, and accordingly, light is intercepted from the backlight 420 to the display panel 320 and then the display panel 320 becomes non-emissive. In addition, the barrier 220 is operated during the display time T1_A such that the barrier cells 221 become opaque and thereby intercept the image and become the barrier A, and the barrier cells 222 become transparent and thereby transmit the image. Therefore, the display panel 320 emits light during the display time T1_A, so that the first left- and right-eye images are displayed.

Then, during a data writing time T2_w of a second time T2 of the first frame, the first right eye image data signal is written to the display cells 321 of the display panel 320. All the cells of the barrier 220 become opaque and thereby intercept light from the backlight 420 to the display panel 320 while the first right eye image data signal is written to the display cells 321. In addition, the barrier 220 is operated such that the barrier cells 221 become transparent during a display time T2_B to thereby transmit the image, and the barrier cells 222 become opaque to become a barrier B. Therefore, the first left- and right-eye images are also displayed during the display time T2_B.

Therefore, during the first period T1 and the second period T2, that is, during the first frame, the first stereoscopic image is displayed. During a second frame, the barrier is operated in the same manner as in the first frame so that a second stereoscopic image is displayed.

According to this embodiment of the present invention, the observer perceives the images displayed during the respective times T1_A and T2_A as a concurrently displayed image, views the image by the respective left and right eyes, and thus perceives a stereoscopic image. The respective data writing times T1_w and T2_w, in this embodiment, are less than a half of the respective display times T1_A and T1_B in order that the stereoscopic image is normally displayed.

In addition, the observer may view the first left-eye image of the display cells 321 through the barrier cells 222 during the first time T1, and the first left-eye image of the display cells 322 through the barrier cells 221 during the second time T2. Consequently, the observer views both of the display cells 321 and 322 during one frame so that the observer may view a stereoscopic image with the same resolution as 2D resolution.

While data is written on the display panel 320, that is, the image is displayed through the barrier 220 during the data writing times T1_w and T2_w, the previously displayed image may be shown concurrently while overlapping with the presently written image. However, according to this embodiment of the present invention, the normally black barrier 220 is not operated while it is opaque during the data writing times T1_w and T2_w. Accordingly, the observer cannot view the presently written image and crosstalk showing overlapped images can be considerably reduced.

Figure 4:
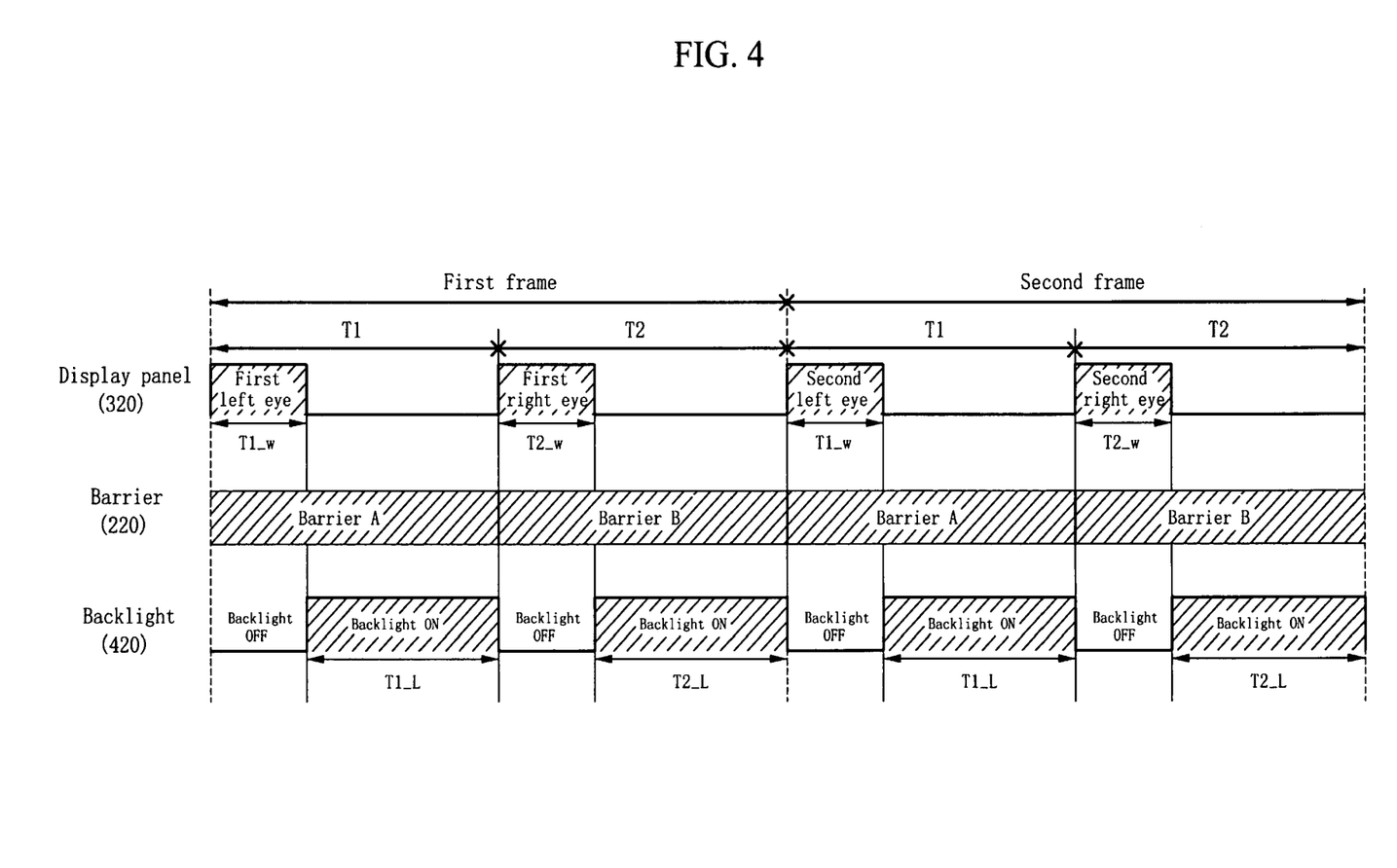
FIG. 4 illustrates a method for driving a stereoscopic image display device according to another exemplary embodiment of the present invention.

FIG. 4 illustrates a method for driving a stereoscopic image display device according to another exemplary embodiment of the present invention.

Figure 3:
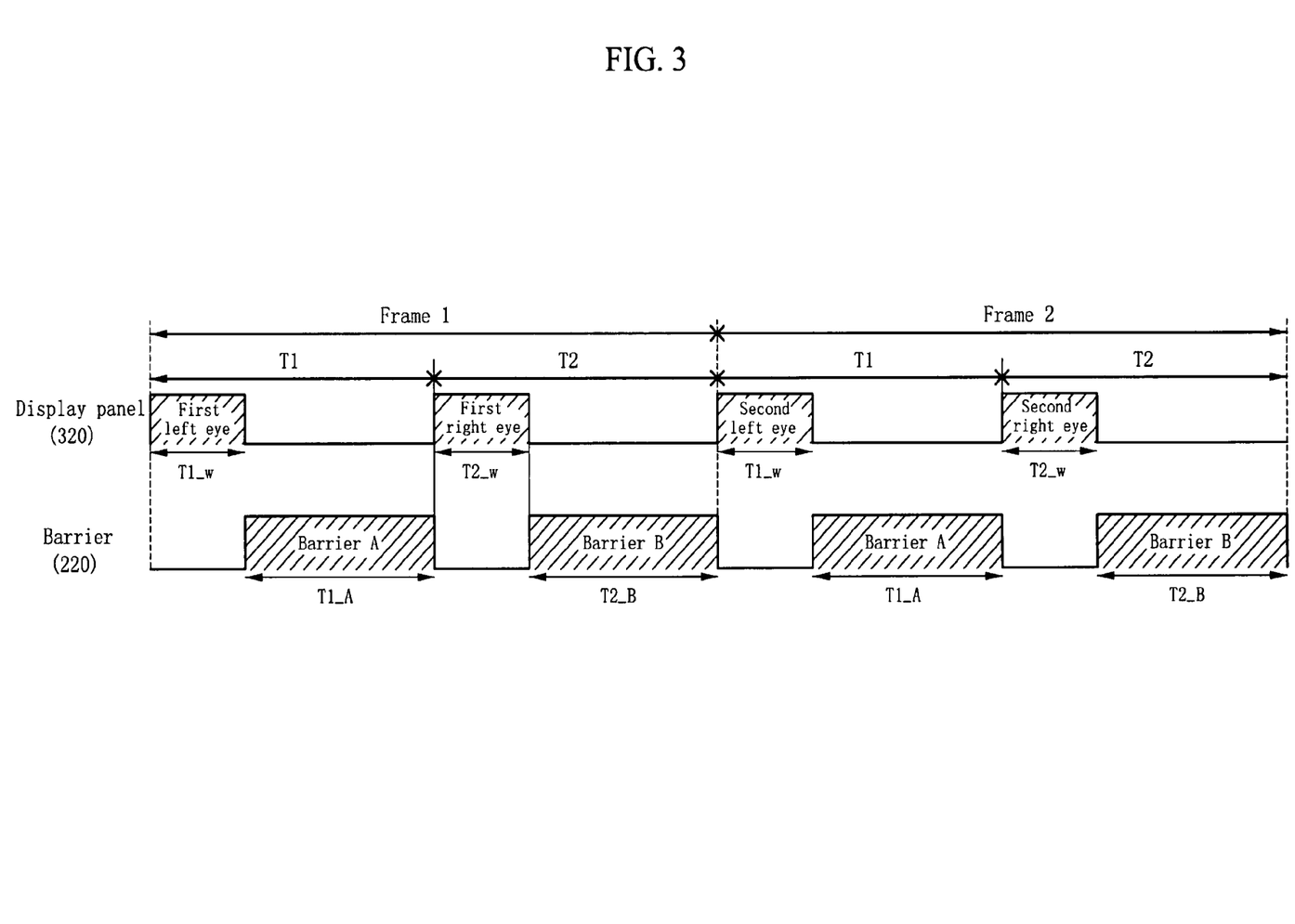
FIG. 3 illustrates a method for driving a stereoscopic image display device according to an exemplary embodiment of the present invention.

This embodiment of the present invention is substantially the same as that described in relation to FIG. 3, except for how the barrier and the backlight are driven. Therefore, the same parts as in the first exemplary embodiment will not be described in detail, and the focus of the following description will be on the driving of the barrier and the backlight.

With reference to FIGS. 2A, 2B, and 4, during the data writing time T1_w of the first time T1 of the first frame, the first left eye image data signal is written on the display cells 321 of the display panel 320. Although not shown, a first right-eye image data signal may be written on the display cell 322 when a first left-eye image data signal is written on the display cell 321. The backlight 420 is turned off during the data writing time T1_w during which the first left-eye image data signal is written on the display cell 321, and is then turned on during the display time T1_L after finishing the data writing time T1_w. The barrier 220 operates during the first time T1 so that the barrier cells 221 become opaque (barrier A) and the barrier cells 222 become transparent. Therefore, during the display time T1_L, the first left- and right-eye images are displayed.

During the data writing time T2_w of the second time T2 of the first frame, the first right eye image data signal is written on the display cell 321 of the display panel 320. Although not shown, the first left-eye image data signal may also be written on the display cell 322. The backlight 420 is turned off during the data writing time T2_w in which the first right-eye image data signal is written on the display cell 321, and is then turned on during the display time T2_L after finishing the data writing time T2_w. Meanwhile, the barrier 220 operates during the second time T2 so that the barrier cells 221 become transparent and the barrier cells 222 become opaque (barrier B). Therefore, during the display time T2_L, the first left- and right-eye images are displayed.

In this manner, the first stereoscopic image is displayed during the first frame, and then the second stereoscopic image is displayed during the second frame.

As such, according to this exemplary embodiment of the present invention, the observer perceives the images displayed during the respective times T1_L and T2_L as the simultaneously displayed image, views the image by the respective left and right eyes, and perceives a stereoscopic image.

In addition, the observer views both of the display cells 321 and 322 during one frame so that the observer may view a stereoscopic image with the same resolution as 2D resolution.

While the data is being written on the display panel 320, that is, during the data writing times T1_w and T2_w, the backlight is not turned on regardless of the operation of the barrier 220, and accordingly, the image is not displayed. With such a structure, the crosstalk showing overlapped images due to the response speed of the liquid crystal can be reduced or minimized, and an operating time of the barrier can be increased because the operation rate of the backlight is faster than that of the liquid crystal. Therefore, the crosstalk can be reduced and the image can be displayed for a sufficient time because the barrier is turned on during the image writing time with the overlapped image and is then turned off during the next image writing time.

Figure 5:
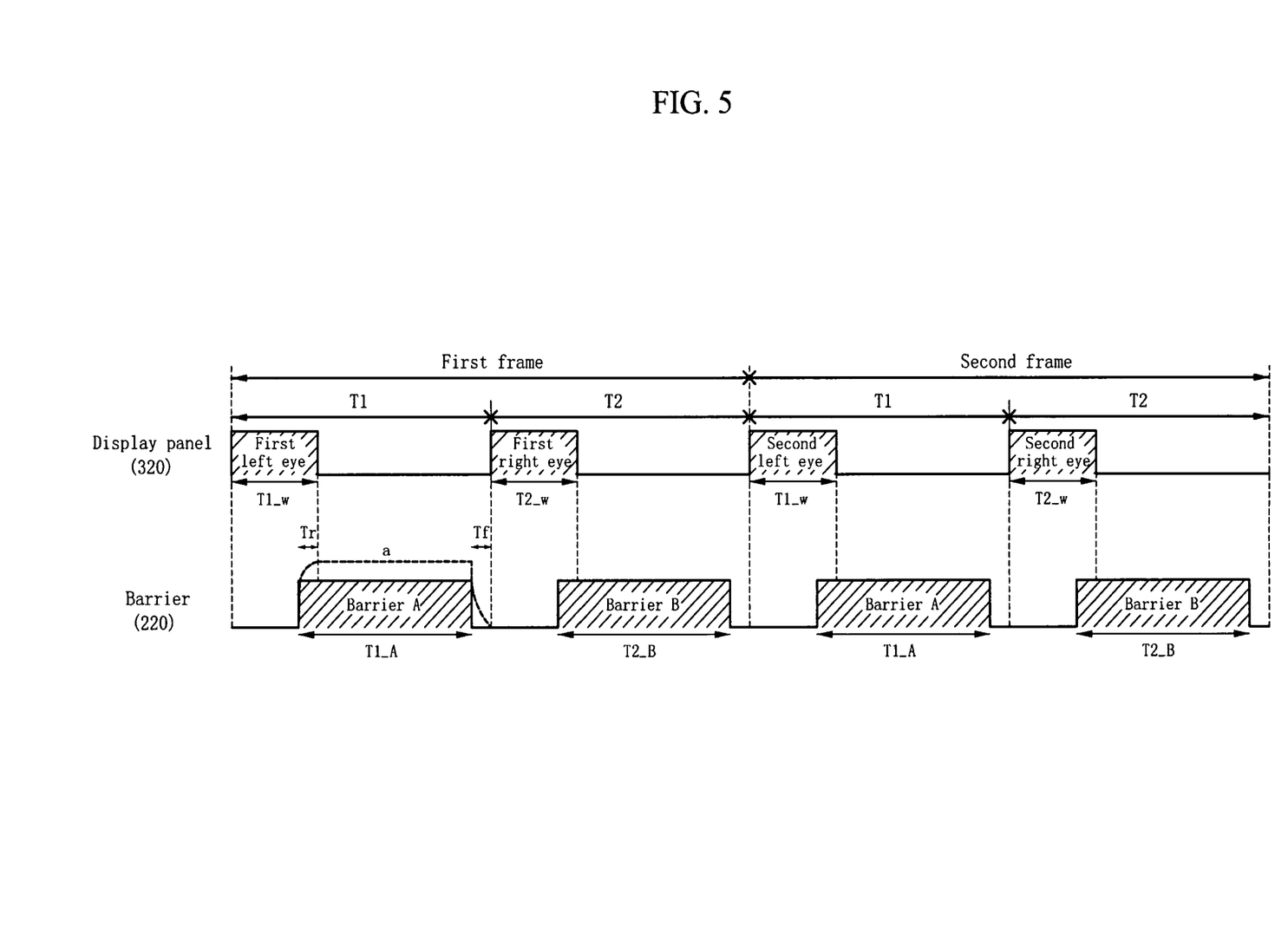
FIG. 5 illustrates a method for driving a stereoscopic image display device according to yet another exemplary embodiment of the present invention.

FIG. 5 illustrates a method for driving a stereoscopic image display device according to yet another exemplary embodiment of the present invention. This exemplary embodiment of the present invention is substantially the same as that shown in FIG. 3, but the barrier is operated before the data writing time ends and the barrier ceases operation before the data writing time starts.

In more detail, as shown in FIG. 5, the barrier 220 is operated as the barrier A before the data writing time T1_w ends. That is, the data writing time T1_w is overlapped with the display time T1_A by a time Tr. In addition, after the display time T1_A ends and then a time Tf passes, the data writing time T2_w is advanced.

In this manner, as shown in a curve (a) illustrating a response speed of the liquid crystal, the barrier 220 may be normally operated as the barrier A when a driving voltage has been applied to the barrier 220 and the time Tr has passed. Therefore, when the time Tr and the data writing time T1_w have ended, the image may be clearly displayed. Likewise, the barrier 220 may be completely operated as the normally black barrier B when the driving voltage has not been applied to the barrier 220 and the time Tr has passed. Therefore, the normally black state may be completed during the data writing time T2_w, so that the image may be intercepted with substantially certainty.

When the barrier is operated such that the on/off time thereof may advance the display time by the operation delay time of the liquid crystal, the crosstalk can be effectively reduced or prevented.

According to the above-described embodiments, the barrier has two recognizable viewing angles of the left/right-eye images. The invention is not limited to these embodiments, however, and the barrier may have, for example, three recognizable viewing angles in which it has at least three transparent areas, and is operated such that the transparent areas are time-divisionally and sequentially opened.

In the embodiments described above, the display panel and barrier of the stereoscopic image display device are time-divisionally operated so that the 3D stereoscopic image can be displayed with the same resolution as 2D.

In one embodiment, the crosstalk can be reduced or minimized by making the entire barrier become opaque while the image is written on the display. Thus, the quality of the displayed stereoscopic image can be enhanced.

In one embodiment, the crosstalk due to the late operation rate of the liquid crystal can also be reduced or minimized by turning off the backlight during the image writing time so that the operating time of the barrier is sufficiently ensured. Thus, the time for displaying an image can be increased or maximized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A method for driving a stereoscopic image display device including a display panel having a first display cell and a second display cell and concurrently displaying a first image at a first recognizable viewing angle and a second image at a second recognizable viewing angle different from the first recognizable viewing angle, and a barrier arranged in a location corresponding to the display panel for intercepting or transmitting light, the method comprising:

during a first period wherein no image is displayed, writing a first data signal corresponding to the first image on the first display cell and writing a second data signal corresponding to the second image on the second display cell;

during a second period, displaying the first image and the second image by driving the barrier to become a first format to transmit light;

during a third period in which no image is displayed, writing the second data signal on the first display cell and writing the first data signal on the second display cell; and during a fourth period, displaying the first and second images by driving the barrier to become a second format to transmit light, wherein the barrier intercepts and transmits light at different angles in the first format than in the second format, and wherein the barrier is driven to intercept light at both the first recognizable viewing angle and the second recognizable viewing angle concurrently, so that no image is displayed during the first period and the third period.

2. The driving method of claim 1, wherein the second period is longer than twice the first period and the fourth period is longer than twice the third period.

3. The driving method of claim 1, wherein the barrier has opaque and transparent regions in the first format that are disposed inversely to respective opaque and transparent regions of the barrier in the second format.

4. The driving method of claim 1, wherein the display panel includes a backlight for supplying light and a non-emissive element for displaying an image using the light of the backlight, and the backlight emits light during the second period and the fourth period.

5. The driving method of claim 4, wherein the barrier is driven to be in the first format during the first period, and in the second format during the third period.

6. A stereoscopic image display device comprising:

a display panel including display cells, the display cells adapted to receive data signals and to display images corresponding to the data signals concurrently at first and second recognizable viewing angles;

a display panel driver adapted to write the respective data signals on the respective display cells of the display panel;

a barrier arranged in a location corresponding to the display panel and including a first barrier cell and a second barrier cell; and a barrier driver adapted to drive the barrier such that the first barrier cell and the second barrier cell become transparent or opaque, wherein the barrier driver is adapted to drive the barrier such that all barrier cells of the barrier including the first barrier cell and the second barrier cell are concurrently opaque to prevent the images from being displayed at both the first and second recognizable viewing angles whenever the data signals are written on the display cells.

7. The stereoscopic image display device of claim 6, wherein:
the display cells include a first display cell and a second display cell;
the data signals include a first image data signal and a second image data signal; and
the display panel driver is adapted to write the first image data signal on the first display cell and the second image data signal on the second display cell during a first period, and to write the first image data signal on the second display cell and the second image data signal on the first display cell during a second period.

8. The stereoscopic image display device of claim 7, wherein the barrier driver is adapted to drive the barrier such that the first barrier cell becomes opaque and the second barrier cell becomes transparent during a third period consecutive to the first period; and the first barrier cell becomes transparent and the second barrier cell becomes opaque during a fourth period consecutive to the second period.

9. The stereoscopic image display device of claim 8, wherein the first period is shorter than one-half of the third period and the second period is shorter than one-half of the fourth period.

10. A stereoscopic image display device comprising:
a display panel including display cells, the display cells adapted to receive data signals and to display images corresponding to the data signals, the display cells having non-emissive elements;
a liquid crystal display panel driver adapted to apply the data signals to the respective display cells of the display panel;
a backlight for supplying light to the display panel;
a backlight driver adapted to drive the backlight such that the backlight is turned off whenever the data signals are written on the display cells;
a barrier arranged in a location corresponding to the display panel and including first and second barrier cells; and
a barrier driver for driving the barrier such that the first and second barrier cells become transparent or opaque,
wherein the display panel comprises first and second display cells,
the data signals comprise first and second image data signals,
the display panel driver is adapted to write the first and second image data signals on the respective first and second display cells during a first period, and to write the first and second image data signals on the respective second and first display cells during a second period, and the backlight driver is adapted to drive the backlight such that the backlight is turned on during a third period consecutive to the first period, and during a fourth period consecutive to the second period, and
wherein the barrier driver is adapted to drive the barrier such that
the first and second barrier cells become respectively opaque and transparent during the first period and the third period, and
the first and second barrier cells become respectively transparent and opaque during the second period and the fourth period.

11. The stereoscopic image display device of claim 10, wherein the first period is shorter than one-half of the third period and the second period is shorter than one-half of the fourth period.

12. A method for driving a stereoscopic image display device including a display panel having first and second display cells adapted to receive data signals and concurrently displaying first and second images having different recognizable viewing angles, a backlight for supplying light to the display panel, a backlight driver adapted to drive the backlight, and a barrier arranged in a location corresponding to the display panel for intercepting and transmitting light, the method comprising:
writing a first data signal of the data signals corresponding to the first image on the first display cells;
writing a second data signal of the data signals corresponding to the second image on the second display cells; and
driving the barrier to become a first format during the writing of the first data signal and the writing of the second data signal,
writing the second data signal on the first display cells;
writing the first data signal on the second display cells; and
driving the barrier to become a second format that is different from the first format,
wherein the writing the first data signal on the first display cells, the writing the second data signal on the second display cells, and the driving the barrier to become a first format are concurrently performed during a first period,
wherein the writing the second data signal on the first display cells, the writing the first data signal on the second display cells, and the driving the barrier in the second format are concurrently performed during a second period, and
wherein the backlight driver is configured to drive the backlight such that the backlight is turned off so that none of the first and second images is displayed whenever the data signals are written on the display cells and such that the backlight is turned on to display the first and second images during a third period between the first period and the second period.

13. The driving method of claim 12, wherein the first period is a driving delay time of the barrier.

14. The driving method of claim 12, wherein the second period is a driving delay time of the barrier.

* * * * *